United States Patent
Nakahara et al.

(10) Patent No.: US 6,630,213 B2
(45) Date of Patent: Oct. 7, 2003

(54) RECORDING MEDIUM EXCELLENT IN INK ABSORPTIVITY AND PROCESS FOR ITS PRODUCTION, AND PROCESS FOR PRODUCING SILICA-ALUMINA COMPOSITE SOL

(75) Inventors: Katsumasa Nakahara, Chiba (JP); Hisao Inokuma, Chiba (JP); Hachirou Hirano, Tokyo (JP); Toshiya Matsubara, Chiba (JP); Masako Wakabayashi, Kanagawa (JP); Yoshinori Kon, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/746,019

(22) Filed: Dec. 26, 2000

(65) Prior Publication Data

US 2001/0008688 A1 Jul. 19, 2001

(30) Foreign Application Priority Data

Dec. 27, 1999 (JP) .............................. 11-369468
Apr. 27, 2000 (JP) ....................... 2000-127035

(51) Int. Cl.$^7$ ................................. B32B 3/00
(52) U.S. Cl. ................. 428/32.32; 428/32.31
(58) Field of Search ................. 428/195, 323, 428/328, 331, 32.31, 32.32

(56) References Cited

U.S. PATENT DOCUMENTS

| | | | | |
|---|---|---|---|---|
| 3,956,171 A | * | 5/1976 | Moore, Jr. et al. | 252/313 |
| 5,707,716 A | * | 1/1998 | Yoshino et al. | 428/212 |
| 5,985,076 A | * | 11/1999 | Misuda et al. | 156/230 |
| 2001/0055055 A1 | * | 12/2001 | Eguchi et al. | 347/105 |
| 2002/0012629 A1 | * | 1/2002 | Yoshino et al. | 423/625 |
| 2002/0048654 A1 | * | 4/2002 | Yoshino et al. | 428/195 |

FOREIGN PATENT DOCUMENTS

WO    WO 99/64354    12/1999

* cited by examiner

*Primary Examiner*—Bruce H. Hess
*Assistant Examiner*—Michael E. Grendzynski
(74) *Attorney, Agent, or Firm*—Oblon, Spivak, McClelland, Maier & Neustadt, P.C.

(57) ABSTRACT

A process for producing a silica-alumina composite sol, which comprises mixing a silica hydrogel and an aluminum salt which, when dissolved in water, gives an acidic solution.

10 Claims, 2 Drawing Sheets

RECORDING MEDIUM EXCELLENT IN INK ABSORPTIVITY AND PROCESS FOR ITS PRODUCTION, AND PROCESS FOR PRODUCING SILICA-ALUMINA COMPOSITE SOL

The present invention relates to a recording medium excellent in ink absorptivity which is suitable for use as a recording medium for an ink jet printer, and a process for its production, and a process for producing a silica-alumina composite sol.

In recent years, along with widespread use of digital cameras or computers, hard copy technology to record such images on paper, etc. has been rapidly developed. As recording systems for hard copies, not only one which directly photographs a display showing the image by silver salt photography, but also various other systems such as a sublimation thermal transfer system, an ink jet system, etc., have been known.

Among them, the ink jet system is one wherein ink droplets comprising a solvent and a dye or pigment are jetted at a high velocity from a nozzle to a recording medium, and in the ink, a large amount of a solvent is contained. A printer employing such an ink jet system has found remarkable widespread use in recent years, since it is easy for full coloring or high speed modification, or its printing noise is low.

In particularly, a printer employing a photo ink of a dye capable of forming a printed image close to a photograph, has been marketed recently, and its market is rapidly expanding by virtue of the good image quality. For a printer of this type, a large amount of thin ink is used for expression of a color of intermediate gradation, whereby the amount of ink tends to be large as compared with a case where a conventional ink is employed. When the amount of ink increases, unless the recording medium readily adsorbs the ink, the ink tends to be flooded and run, or absorption irregularity of ink so-called beading tends to result, whereby the commercial value will be impaired. Therefore, a recording medium for a photo ink jet printer is required to absorb a large amount of ink more quickly than ever.

Further, an ink jet printer employing a pigment ink is expected to rapidly gain popularity in future, since it has a feature that as compared with an ink jet printer employing a dye ink, the weather resistance of printed images is excellent. Also such an ink jet printer employing a pigment ink, is required to absorb a large amount of ink quickly from the view point of high image quality and high speed printing.

Heretofore, as a recording medium for an ink jet printer, one comprising a substrate such as a film or paper sheet and a porous ink-receiving layer formed thereon, which is composed of inorganic fine particles of e.g. silica or alumina, and a binder such as polyvinyl alcohol, has been known. For example, JP-A-2-276670 discloses a recording medium comprising a substrate and an ink-receiving layer formed thereon, which is composed of pseudo boehmite. Further, JP-A-10-231120 discloses a powder of alumina hydrate and alumina sol which has a large pore volume and a large average pore radius and is excellent in ink absorptivity and transparency, to be used for an ink-absorbing layer of a recording medium.

Further, the present inventors have previously proposed in WO99/64354 a recording medium provided with a porous layer having good ink absorptivity, prepared from a coating fluid employing a certain specific silica-alumina composite sol.

However, as mentioned above, with an ink jet printer employing a dye photo ink or a pigment ink, a high image quality and high printing speed will be required more than ever, and accordingly, as an ink-receiving layer, it is required to absorb the solvent contained in a large amount in the ink as quickly as possible. Thus, a recording medium having an ink-receiving layer having a higher ink absorbing ability than ever, has been desired.

A silica type material such as silica gel has proper pores, but, usually, the surface of silica particles is negatively charged and can not adsorb a direct dye or an acid dye having anionic dissociative groups, which is employed for an ink jet system, and the water resistance is low.

Therefore, JP-A-60-257286 discloses a method wherein poly aluminum chloride is incorporated to an ink-receiving layer. However, the poly aluminum chloride is a water-soluble salt. Accordingly, the poly aluminum chloride in the ink-receiving layer is likely to be dissolved in water and cause pit-like defects on appearance on the surface of the ink-receiving layer, and the water resistance has not yet been necessarily adequate. Further, when the medium is stored for a long period of time, the poly aluminum chloride is likely to migrate and clog pores in the ink-receiving layer, whereby the ink absorptivity tends to deteriorate.

Further, JP-B-47-26959 discloses a method for producing a positively charged colloidal silica sol, which comprises coating the silica surface with alumina. Namely, a silica sol having a particle diameter of from 2 to 150 nm is gradually added to an aqueous solution of poly aluminum chloride, and this mixture is aged until the pH becomes constant, i.e. usually until the pH becomes not higher than 4, followed by an addition of an alkali to bring the pH of the mixture to a level of from about 4.5 to 7.0. By this method, it is possible to obtain a silica sol having the surface coated with alumina, which is excellent in transparency and stability. However, the sol is not in the form of secondary aggregate particles, and the pore volume and the pore radius of a xerogel obtained by drying the sol, are small, and the ink-receiving layer formed by using it tends to have inadequate ink absorptivity.

An ink-receiving layer formed by using an alumina hydrate such as pseudo boehmite, is excellent from the viewpoint of the ink absorptivity, transparency, water resistance, gloss, etc. However, it has had a problem from the viewpoint of the scratch resistance. This is believed to be attributable to the fact that the aluminum hydrate is not spherical. To solve this problem, JP-A-7-76162 discloses a method wherein a silica gel layer having a thickness of from 0.1 to 30 $\mu$m is formed on a porous layer made of pseudo boehmite. However, this silica gel layer has a drawback that it impairs the ink absorptivity, and from the viewpoint of industrial production, such a double layer structure is disadvantageous.

The present invention provides a process for producing a silica-alumina composite sol, which comprises mixing a silica hydrogel and an aluminum salt which, when dissolved in water, gives an acidic solution.

Further, the present invention provides a process for producing a recording medium, which comprises coating on a substrate a coating fluid comprising a binder and a silica-alumina composite sol obtained by mixing to a silica hydrogel an aluminum salt which, when dissolved in water, gives an acidic solution, followed by drying to form an ink-receiving layer.

Still further, the present invention provides a recording medium comprising a substrate and an ink-receiving layer formed thereon, wherein in the ink-receiving layer, the total pore volume of pores with radii of from 0.7 to 100 nm as measured by a nitrogen adsorption/desorption method, is at least 0.8 cm$^3$/g, and the average pore radius as defined by a radius corresponding to a pore volume of ½ of the pore volume of pores with radii of from 0.7 to 100 nm in a cumulative pore volume distribution curve obtained by a BJH method from a nitrogen desorption isothermal line, is at least 14 nm.

Furthermore, the present invention provides an ink jet recording medium comprising a substrate and a porous ink-receiving layer formed thereon, whereby when a black ink drop having a diameter of 50 μm and a volume of 65 pL is printed on the surface of the ink-receiving layer of the recording medium, the time for absorption of the ink drop is at most 10 msec, and the dot diameter obtained from the geometric average after the printing is at most 115 μm.

According to the present invention, as compared with conventional recording media, a remarkable large ink absorptivity can be attained without deteriorating the properties such as color-reproducibility, image density and weather resistance. This is attributable to the fact that the ink-receiving layer of the recording medium of the present invention has a pore volume and an average pore radius which are so large as have not been seen before. It has been found possible for the first time by the present inventors that such large pore volume and average pore radius can be accomplished by a recording medium having an ink-receiving layer containing a novel xerogel having certain specific physical properties, which is obtainable from the above-mentioned specific silica-alumina composite sol.

Accordingly, such large pore volume and average pore radius can not be accomplished with a xerogel obtainable from a composite sol as described above and as shown in WO99/64354, even if the same silica-alumina composite sol is used.

Figure 1:
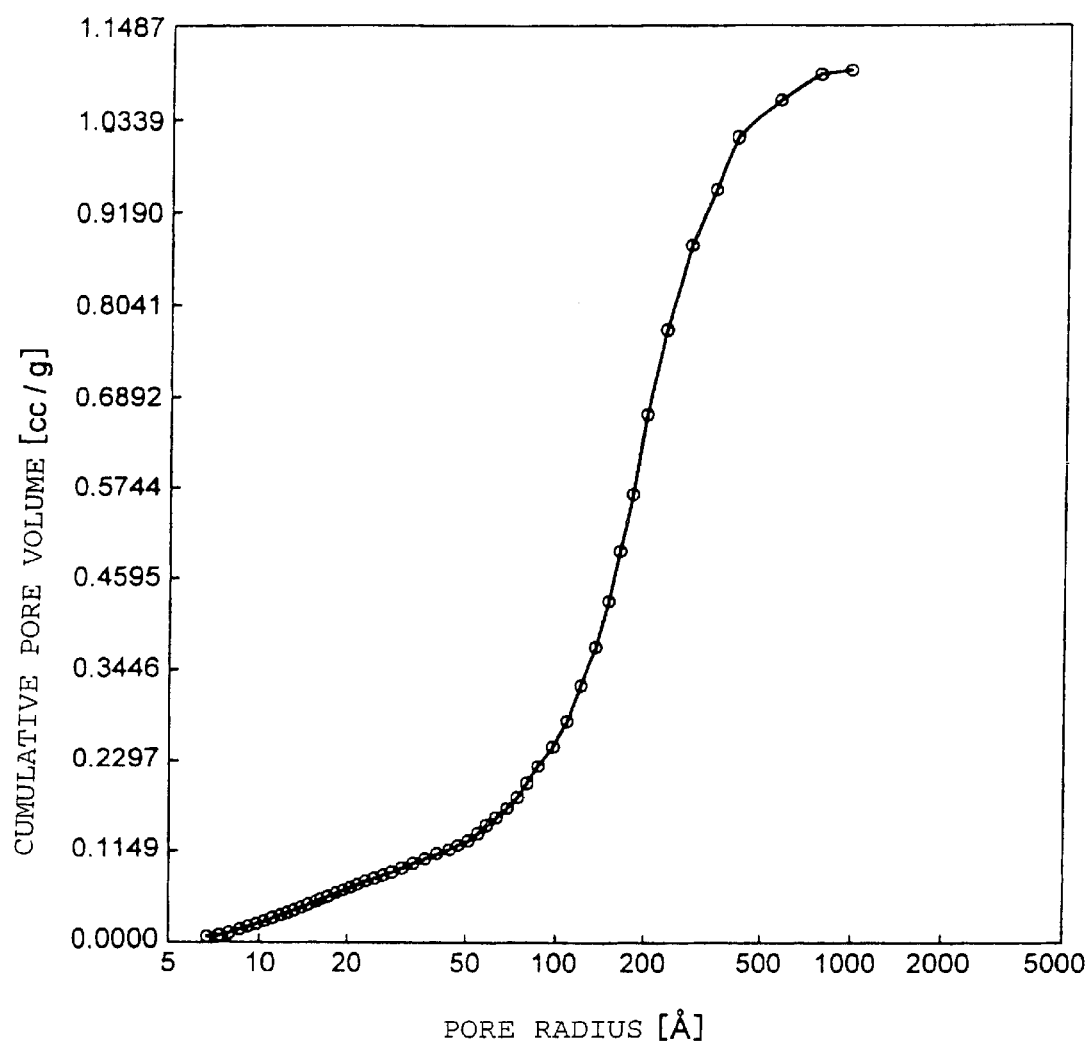
FIG. 1 shows a cumulative pore volume distribution curve of an ink-receiving layer in the ink jet recording sheet of Example 6 of the present invention.

Now, the present invention will be described in further detail with reference to the preferred embodiments.

In the present invention, the pore characteristics of the ink-receiving layer of a recording medium will be measured or defined by the following methods, respectively. Namely, the pore characteristics are measured by a nitrogen adsorption/desorption method. Further, the average pore radius means a radius corresponding to a pore volume of ½ of the pore volume of pores with radii of from 0.7 to 100 nm in a cumulative pore volume distribution curve (a graph in which the abscissa represents the pore radius, and the ordinate represents the cumulative pore volume) obtained by a BJH method from a nitrogen desorption isothermal line.

As mentioned above, the ink-receiving layer of the recording medium of the present invention has a total pore volume and an average pore radius which are so large as have not been seen before. Namely, the total pore volume is at least 0.8 cm$^3$/g, and the average pore radius is at least 14 nm. A recording medium having an ink-receiving layer having such large total pore volume and average pore radius, is novel, whereby the above described excellent ink absorbing ability can be obtained. Further, according to the present invention, it is possible to obtain a recording medium having an ink-receiving layer wherein the total pore volume is at least 0.8 cm$^3$/g, and the average pore radius is at least 20 nm, and further, a recording medium having an ink-receiving layer in which the total pore volume is at least 1.0 cm$^3$/g, and the average pore radius is at least 14 nm.

In order to obtain an ink-receiving layer having such large pore volume and average pore radius, the specific silica-alumina composite sol is preferably employed as mentioned above. Such a silica-alumina composite sol is one which, in the form of a xerogel obtainable by removing the solvent from the sol, has pore characteristics such that the pore volume is preferably at least 1.3 cm$^3$/g and the average pore radius is preferably at least 15 nm.

A preferred example of the silica-alumina composite sol for forming a xerogel having such pore characteristics, is a colloidal solution comprising an aqueous medium and aggregate particles dispersed therein each comprising silica and alumina, wherein the primary particles of silica are spherical, the average particle diameter of the primary particles is from 2 to 300 nm, preferably from 2 to 30 nm, the average particle diameter of the aggregate particles is preferably from 100 to 1,000 nm, and the zeta potential of the aggregate particles is preferably at least +10 mV at a pH of from 3 to 9.

If the average particle diameter of the above aggregate particles is too large, a large amount of a binder will be required in order to obtain a smooth ink-receiving layer which is free from cracks on the surface and which has good adhesion to the substrate, and consequently, the pore volume and the average particle radius of the ink-receiving layer tend to be small. On the other hand, if the average particle diameter of the aggregate particles is too small, the pore volume and the average pore radius of the silica-alumina composite sol tend to be small. A particularly preferred range of the average particle diameter of the aggregate particles is from 200 to 800 nm.

Further, the above-mentioned silica-alumina composite sol has a positive charge such that the zeta potential of the aggregate particles is at least +10 mV at a pH of from 3 to 9 and thus is capable of adsorbing a dye having anionic dissociative groups, which is used for ink jet, whereby the ink will not run even when water is splashed after formation of the image, and the water resistance of the image can be obtained.

The method for producing such a silica-alumina composite sol is not particularly limited. However, it may be prepared preferably by reacting a silica hydrogel obtained by mixing an alkali metal silicate and an acid, and an aluminum salt which, when dissolved in water, gives an acidic solution (in the present invention, referred to as an acidic aluminum salt), then removing a salt in the solution, and adding an acid for peptization.

Such a silica hydrogel obtained from an alkali metal silicate is a novel hydrogel having primary particles of silica aggregated and containing a large amount of a salt (NaCl). Therefore, it can be distinguished from a conventional silica-alumina composite sol obtained by combining alumina with a silica sol as a starting material, as disclosed in WO99/64354, by e.g. the size of the pore volume of the xerogel obtainable by removing the solvent from the sol. Namely, in the case of the above-mentioned conventional silica-alumina composite sol, it is impossible to obtain a xerogel having a pore volume larger than 1.0 cm$^3$/g. By the above-mentioned silica hydrogel of the present invention, it is possible for the first time to obtain an ink-receiving layer having the desired large pore volume and average pore radius.

Now, the process for producing the silica-alumina composite sol to be used in the present invention, will be described in detail. As the silica hydrogel to be used as a starting material for the silica-alumina composite sol in the present invention, one obtained by mixing an alkali metal silicate with an acid, is preferred. The method for mixing the alkali metal silicate with the acid is not particularly limited. Namely, the acid may be added to an aqueous solution of the alkali metal silicate, or an aqueous solution of the alkali metal silicate may be added to the acid. The time for mixing is influential over the pore volume and average pore radius of the resulting silica-alumina composite sol, and preferably, the mixing is carried out slowly over a period of from 0.5 to 8 hours. As the mixing is slower over a longer period of time, a silica-alumina composite sol having a larger average pore radius, can be obtained.

In a method wherein the silica hydrogel is obtained by adding to an alkali metal silicate a salt having a function to aggregate silica, followed by mixing with an acid, primary particles of the silica sol are aggregated by the addition of the salt, to form secondary aggregate particles, whereby a silica-alumina composite sol which has a large average pore radius and which is excellent in ink absorptivity, can be obtained. The type of the salt is not particularly limited so long as it has a function to aggregate silica, and sodium chloride or sodium sulfate may, for example, be mentioned. The amount of such a salt is preferably at most 60%, based on the silica.

The pH after mixing the alkali metal silicate with the acid, is preferably from 4 to 11. If the pH is lower or higher than this range, the primary particle diameter of the resulting silica tends to be too small, such being undesirable. The concentration of silica in the silica hydrogel after the mixing, is preferably at most 20%. If the silica concentration is too high, it tends to be difficult to obtain a silica-alumina composite sol having good dispersibility. The $SiO_2/Na_2O$ molar ratio in the alkali metal silicate is not particularly limited, but it is preferably from 1.0 to 4.0. The larger the molar ratio, the smaller the amount of the acid to be mixed to neutralize $Na_2O$.

In the present invention, the obtained silica hydrogel may preferably be aged for from 1 to 24 hours. By this aging, primary particles of silica will grow, whereby it is possible to obtain a silica-alumina composite sol having large pore volume and average pore radius. The higher the temperature and the longer the period for aging, the larger the primary particle diameter of the silica, whereby it is possible to obtain a silica-alumina composite sol having large pore volume and average pore radius.

In the present invention, this silica hydrogel may be mechanically pulverized as the case requires, prior to the addition of the acidic aluminum salt. In a case where a silica hydrogel is to be obtained by mixing an alkali metal silicate with an acid, it may happen that a silica hydrogel having a large diameter of about a few mm, will form, depending upon the mixing method. In such a case, it is advisable to pulverize the silica hydrogel in order to make more uniform the subsequent reaction upon addition of the acidic aluminum salt. The degree of such pulverization is preferably at least such that the average particle diameter will be at most 100 μm. As the pulverization method, a method of using a colloid mill, a beads mill, a homogenizer or a supersonic disperser, may be mentioned.

In the present invention, without subjecting this silica hydrogel to dealkalization or desalting, the acidic aluminum salt may directly be added thereto, whereby a silica-alumina composite sol can be obtained. As the acidic aluminum salt, an inorganic acid salt of aluminum hydroxide with a strong acid, such as aluminum chloride, aluminum sulfate, aluminum nitrate or polyaluminum chloride, or an organic salt such as aluminum acetate, may preferably be employed.

The polyaluminum chloride is preferably a compound represented by the chemical formula $[Al_2OH]_nCl_{6-n}]_m$ (wherein $1<n<6$, and $m<10$). For example, it may be one commercially available in a tradename of Takibine #1500 or PAC250A, manufactured by Taki Chemical Co., Ltd. The acidic aluminum salt may be dissolved in water, as the case requires, and then mixed with the silica hydrogel.

The method for mixing the silica hydrogel and the acidic aluminum salt is not particularly limited. Namely, the acidic aluminum salt may be added to the silica hydrogel, or the silica hydrogel may be added to a solution of the acidic aluminum salt. At the time of mixing the silica hydrogel and the acidic aluminum salt, it is preferred to stir the mixture in order to avoid the possibility that the concentration becomes non-uniform locally.

The temperature at the time of mixing the silica hydrogel and the acidic aluminum salt is preferably from 25 to 150° C. If the temperature is lower than 25° C., the reaction rate tends to be slow, and no adequate alumina tends to deposit on the surface of the silica particles, such being undesirable. If the temperature is higher than 150° C., the operation tends to be difficult, such being undesirable. The amount of the acidic aluminum salt to be added, is preferably such an amount that the zeta potential of the silica-alumina composite sol will be at least +10 mV, particularly preferably at least 20 mV. By bringing the zeta potential to a level of at least +10 mV, it is possible to form an ink-receiving layer which has a fixing property to a dye having anionic dissociative groups and which provides excellent water resistance of an image.

In a preferred silica hydrogel of the present invention, the average particle diameter of primary particles of silica is preferably from 2 to 300 nm, more preferably from 2 to 30 nm. In such a case, it is preferred to add the acidic aluminum salt in an amount of from 1 to 900 g, particularly preferably from 1 to 40 g, as $Al_2O_3$, per 100 g of the $SiO_2$ component in the silica hydrogel. As the amount of $Al_2O_3$ increases, the zeta potential of the aggregate particles tends to be large. However, if the amount of $Al_2O_3$ to be added is too large, the pore volume and the pore radius of the silica-alumina composite sol tend to decrease, such being undesirable.

Further, this solution prepared by mixing the silica hydrogel and the acidic aluminum salt may be aged at a pH of from 7 to 10 to carry out aggregating treatment. By this aggregating treatment, the average pore radius, the total pore volume and the specific surface area of the silica-alumina composite sol can be made large, and the ink absorptivity of the ink-receiving layer employing such a silica-alumina composite sol can be made excellent.

The solution prepared by mixing the silica hydrogel and the acidic aluminum salt is acidic and contains a large amount of impurity ions such as alkali metal ions. Accordingly, it is preferably purified by removing such impurity ions. In order to efficiently carry out such purification, it is advisable to adjust the pH of the solution to a level of from 7 to 9, prior to the purification, for example, by adding an alkali metal hydroxide to the solution prepared by mixing the silica hydrogel and the acidic aluminum salt. As a method for removing impurity ions, it is preferred to employ an ultra filter, whereby the removal can be carried out efficiently.

After removing the impurity ions, the solution is concentrated as the case requires, to obtain a silica-alumina composite sol. The obtained silica-alumina composite sol may be as it is, in a case where the average particle diameter of the aggregate particles is at most 1,000 nm. However, the composite sol may be peptized as the case requires to adjust the average particle diameter of the aggregate particles. The average particle diameter of the aggregate particles can be reduced by e.g. pulverization by means of a beads mill or by ultra sonic dispersion.

Further, in a case where a peptizing agent is to be added for the above peptization, the peptizing agent is not particularly limited, and an inorganic acid such as hydrochloric acid, nitric acid, sulfuric acid or an amide sulfuric acid, or an organic acid such as acetic acid, may suitably be used. These peptizing agents may be used alone or in combination as a mixture of a plurality of them.

Further, the silica-alumina composite sol of the present invention is such that a xerogel obtained by removing the solvent from the composite sol, has a specific surface area of at least 50 m$^2$/g, an average pore radius of at least 10 nm, and total pore volume of pores with radii of from 1 to 100 nm of at least 0.50 cm$^3$/g. Accordingly an ink-receiving layer formed by using such a silica-alumina composite sol is excellent in ink absorptivity. These pore characteristics are measured by a nitrogen adsorption/desorption method.

A method for producing a recording medium having an ink-receiving layer of the present invention, by forming on a substrate surface the silica-alumina composite sol obtained as described above, is not particularly limited. Preferably, however, a process may be mentioned which comprises coating on a substrate a coating fluid comprising a binder and the above-described silica-alumina composite sol, followed by drying.

The substrate in such a case, is not particularly limited, and a film of a resin such as polyethylene terephthalate or polyvinyl chloride, papers such as natural papers or synthetic papers, such as woodfree paper, Japanese paper, photographic paper, various coated papers or photographic base paper, cloth, metals, leathers, wood, glass, or ceramics such as potteries, may, for example, be mentioned.

The binder to be used together with the silica-alumina composite sol, is not particularly limited. However, preferred may, for example, be starch and its modified products, polyvinyl alcohol and its modified products, cellulose derivatives such as carboxymethyl cellulose, SBR rubber latex, NBR latex, and polyvinyl pyrrolidone. Among them, those having large molecular weights and saponification degrees, are preferred. For example, a polyvinyl alcohol (tradename: Kuraraypoval 140H), manufactured by Kuraray Co., Ltd., may be mentioned.

The amount of the binder is preferably as small as possible, since it tends to clog pores of the silica-alumina composite sol and thereby lower the pore volume. However, if it is too small, the strength of the ink-receiving layer tends to be weak, and the adhesion to the substrate will also be poor, whereby a so-called powder falling phenomenon tends to occur, and cracks are likely to form on the surface, such being undesirable. In the present invention, in the case of the above described silica-alumina composite sol, a good ink-receiving layer free from apparent defects can be obtained with a small amount of the binder, preferably from 10 to 40 parts by mass, particularly preferably from 15 to 30 parts by mass, in a solid content ratio, per 100 parts by mass of the composite sol. As a result, also in the obtained ink-receiving layer, the binder is contained in a small amount at a level of preferably from 10 to 40 parts by mass, particularly preferably from 15 to 30 parts by mass, in a solid content ratio, based on the xerogel formed from the silica-alumina composite sol. Thus, the ink-receiving layer formed by using such a silica-alumina composite sol, which has large pore volume and average pore radius, will be excellent in the ink absorptivity.

In the present invention, the method for coating on the substrate the coating fluid comprising a binder and the silica-alumina composite sol, is not particularly limited. For example, a bar coater, a die coater, an air knife coater or a gravure coater may be mentioned. The amount of the ink-receiving layer coated on the substrate, is preferably from 5 to 40 g/m$^2$, particularly preferably from 15 to 25 g/m$^2$.

The present invention provides an ink jet recording medium comprising a substrate and a porous ink-receiving layer formed thereon, whereby when a black ink drop having a diameter of 50 μm and a volume of 65 pL is printed on the surface of the ink-receiving layer of the recording medium, the time for absorption of the ink drop is at most 10 msec, and the dot diameter obtained from the geometric average after the printing is at most 115 μm. By a study conducted by the present inventors, it has been found that in order to obtain a clear image free from beading at a quick ink absorbing speed, the time for absorption of the ink drop when the above-mentioned ink drop is printed on the ink-receiving layer and the dot diameter after the printing, are required to be not higher than the above specific values, respectively. An ink jet recording medium having such characteristics is presented for the first time by the present invention, and if the above-mentioned time for absorption of the ink drop or the dot diameter after the printing exceeds the above specified value, beading is likely to result, and a clear image tends to be hardly obtainable. Further, in the present invention, when the ink-receiving layer of the ink jet recording medium, having the above specified time for absorption of the ink drop and the above specified dot diameter after the printing, is formed of a xerogel obtained from the specific silica-alumina composite sol obtained by the reaction of the acidic aluminum salt and the silica hydrogel as described below, the adhesion of the ink-receiving layer with the substrate is good, and the ink-absorbing capacity is large.

The recording medium of the present invention is one having the specific time for absorption of the ink drop and the specific dot diameter, as mentioned above. Such characteristics and numerical values in this invention are measured by the following methods.

The time for absorption of the ink drop is measured as follows. From an ink jet discharge nozzle, a black ink drop is printed on the surface of the recording medium so that the ink drop will have a diameter of 50 μm and a volume of 65 pL. At that time, by means of a high-speed camera, the process from the instance when the ink drop reaches the surface of the ink-receiving layer of the recording medium to the instance when the ink drop is absorbed, is directly photographed at a photographing speed of 2,000 frames/sec, and the photographed images are stored. Thereafter, the stored images are reproduced, and the time from the instance when the ink drop reaches the surface of the ink-receiving layer to the instance when it is absorbed, is measured and taken as the time for absorption of the ink drop.

On the other hand, the measurement and the calculation method of the dot diameter are as follows. The diameter of the dot printed on the surface of the ink-receiving layer of the recording medium in the same manner as described above, was directly measured by means of an optical microscope and a measuring device. At that time, the dot diameter in the long axis direction is represented by a, and the dot diameter in the short axis direction is represented by b, and the value calculated by the following formula is taken as the dot diameter obtained from the geometric average.

$$\text{Dot diameter by geometric average} = (a \cdot b)^{0.5}$$

In the present invention, when the time for absorption of the ink drop and the dot diameter thus obtained are at most 10 msec and at most 115 μm, respectively, the recording medium has excellent characteristics. It has been found that particularly when the time for absorption of the ink drop is at most 8 msec, and the dot diameter obtained from the geometric average after the printing is at most 110 μm, an excellent performance with a high image clearness can be obtained.

Now, the present invention will be described in further detail with reference to specific Examples. However, it should be understood that the present invention is by no means restricted to such specific Examples. In the following description, Examples 1 to 3 and 6 to 8 are Working Examples of the present invention, and Examples 4, 5 and 9 to 11 are Comparative Examples.

EXAMPLE 1

Into a glass reactor having a capacity of 2 l, 554.8 g of a No. 3 sodium silicate solution ($SiO_2$ concentration: 28.84 mass %, $Na_2O$ concentration: 9.31 mass %) and 1,042.9 g of deionized water were put, and 295.0 g of 5 mol/l hydrochloric acid was slowly added thereto over a period of 55 minutes with stirring. Thereafter, the mixture was heated to 80° C. and aged at 80° C. for 4 hours with stirring, to obtain a silica hydrogel. This silica hydrogel contained coarse particles having a diameter of a few mm, and it was pulverized to an average particle diameter of 30 μm by means of a colloid mill and an ultrasonic disperser.

The pulverized silica hydrogel was again put into a glass reactor having a capacity of 2 l and heated to 80° C. with stirring, and an aqueous polyaluminum chloride solution (Takibine #1500, tradename, manufactured by Taki Chemical Co., Ltd.; aluminum concentration calculated as $Al_2O_3$: 23.6 mass %, Cl concentration: 8.1 mass %, basicity: 84%) in such an amount that the mass ratio of $Al_2O_3$ in the polyaluminum chloride to the mass of $SiO_2$ in the silica hydrogel would be 100:20, was gradually added over a period of about 10 minutes. After completion of the addition, the mixture was maintained at 80° C. for one hour with stirring and then, cooled to room temperature to obtain a solution of a mixture of a silica hydrogel and an acidic aluminum salt.

To this reaction solution at room temperature, a 5 mol/l sodium hydroxide solution was added to adjust the pH of the reaction solution to 7.7. Then, by means of an ultrafiltration apparatus, ultrafiltration was carried out while maintaining the amount of the liquid to be constant by adding deionized water until the electrical conductivity of the filtrate decreased to a level of not higher than 20 μS/cm, for purification.

Then, to this purified solution, an amide sulfuric acid solution having a concentration of 10 mass %, was added to bring the pH to 4.0, and the solution was heated and concentrated under reduced pressure and cooled. Then, the amide sulfuric acid solution having a concentration of 10 mass % was added again to adjust the pH to 4.0 to obtain a silica-alumina composite sol.

EXAMPLE 2

Purification, concentration and peptization were carried out in the same manner as in Example 1 except that in Example 1, the addition of hydrochloric acid was changed from 55 minutes to 4 hours, the pulverization of the silica hydrogel was carried out until the average particle diameter became 42 μm instead of 30 μm, and the aqueous polyaluminum chloride solution was used in such an amount that the mass ratio of $Al_2O_3$ in the polyaluminum chloride to the mass of $SiO_2$ in the silica hydrogel would be 100:22, to obtain a silica-alumina composite sol.

EXAMPLE 3

A silica-alumina composite sol was obtained in the same manner as in Example 1 except that in Example 1, instead of the polyaluminum chloride, an aqueous solution of aluminum chloride (aluminum concentration calculated as $Al_2O_3$: 11.9 mass %, Cl concentration: 23.8 mass %) was used and added in such an amount that the mass ratio of $Al_2O_3$ in the aluminum chloride to the mass of $SiO_2$ in the silica hydrogel would be 100:10.

EXAMPLE 4

An alumina sol was obtained in accordance with the method in Example 1 of JP-A-10-231120, i.e. a method in which a sodium aluminate solution was added to a liquid comprising polyaluminum chloride and water, heated to 95° C., and the slurry thereby aged was washed with deionized water and again heated to 95° C., whereupon acetic acid was added, followed by peptization and concentration, and ultrasonic vibration was imparted.

EXAMPLE 5

A silica gel powder (Sunsphere H33, tradename, manufactured by Dohkai Chemical Industry CO., LTD.; average particle diameter by Coulter counter: 2.5 lam, oil absorption according to JIS K5101: 383 $cm^3$/100 g) was dispersed in water to obtain a dispersion.

With respect to the silica-alumina composite sols in Examples 1 to 3, the alumina sol of Example 4 and the dispersion of a silica gel powder of Example 5, obtained as described above, the physical properties were measured by the following methods. The results are shown in Tables 1 and 2.

1) Primary particle diameter of silica:

For the primary particle diameter of silica in the silica hydrogel, firstly, the specific surface area was obtained by titration with sodium hydroxide in accordance with the method disclosed by Analytical, Chemistry, 28[12] 1981–1983(1956), and then, the primary particle diameter of silica was calculated by the following formula:

$$D=6000/A\cdot d$$

where D is the primary particle diameter (nm) of silica, A is the specific surface area ($m^2$/g), and d is the density (2.2 g/$cm^3$).

2) Concentration:

The silica alumina composite sol, the alumina sol or the dispersion of a silica gel powder, was dried at 120° C. until it became a constant mass, and the concentration was obtained from the difference in mass as between before and after the drying.

3) pH:

Measured by a pH meter (HM-12P, tradename, manufactured by Toa Denpa Co., Ltd.)

4) Zeta potential:

Measured by an electrophoretic light scattering photometer (ELS-800, tradename, manufactured by Otsuka Denshi Co., Ltd.)

5) Average particle diameter of aggregate particles:

With respect to the silica-alumina composite sol, the average particle diameter was measured by a particle size analyzer (Microtrack UPA, MODEL 9340 UPA, tradename, manufactured by Nikkisou Co., Ltd.)

6) BET specific surface area, pore volume and average pore radius:

The silica-alumina composite sol, the alumina sol or the dispersion of a silica gel powder, was dried at 120° C. until it became a constant mass, to obtain a powder of a xerogel. This powder was vacuum-deairated at 120° C. under a pressure of at most 13.3 Pa for two hours. Then, using a nitrogen adsorption/desorption apparatus (Autosorb 3B model, tradename, manufactured by Quantachrome Company), the isothermal line for adsorption/desorption of nitrogen was measured, and the specific surface area, the pore volume and the average pore radius were obtained therefrom.

Here, the specific surface area is a value measured by a BET multipoint method. The pore volume is the volume of pores with pore radius of from 0.7 to 100 nm calculated by a BJH method from the nitrogen desorption isothermal line. Further, the average pore radius is the radius corresponding to a pore volume of ½ of the pore volume of pores with radii of from 0.7 to 100 nm in a cumulative pore volume distribution curve (a graph wherein the abscissa represents the pore radius and the ordinate represents the cumulative pore volume) obtained by a BJH method from a nitrogen desorption isothermal line.

TABLE 1

| Example No. | Primary particle diameter of silica (nm) | Sol concentration (mass %) | pH | Zeta potential (mV) | Average particle diameter of aggregate particles (nm) |
|---|---|---|---|---|---|
| Ex. 1 | 6.5 | 18.3 | 4.0 | +40 | 434 |
| Ex. 2 | 7.4 | 26.5 | 4.0 | +42 | 321 |
| Ex. 3 | 6.5 | 15.5 | 4.0 | +24 | 674 |
| Ex. 4 | — | 14.5 | 4.4 | +54 | 172 |
| Ex. 5 | — | 15.0 | 5.5 | −22 | Unmeasurable due to sedimentation of particles |

TABLE 2

| | Specific surface area ($m^2/g$) | Pore volume ($cm^3/g$) | Average pore radius (nm) |
|---|---|---|---|
| Ex. 1 | 228 | 1.53 | 16.2 |
| Ex. 2 | 163 | 1.37 | 22.7 |
| Ex. 3 | 196 | 1.75 | 17.0 |
| Ex. 4 | 163 | 0.93 | 10.7 |
| Ex. 5 | 723 | 2.12 | 11.6 |

Now, recording media having porous ink-receiving layers formed by using the silica-alumina composite sols, the silica sols and the silica gel dispersion obtained in Examples 1 to 5, and the process for their production, will be described.

EXAMPLE 6

An aqueous solution containing 5.5 mass % of polyvinyl alcohol (Kuraraypoval 140H, tradename, manufactured by Kuraray Co., Ltd.) was mixed to the silica-alumina composite sol of Example 1 in such a ratio that the solid content mass ratio of the sol to the polyvinyl alcohol would be 100:20, to obtain a coating fluid. The coating fluid was coated on a polyester film (Melinex 708, manufactured by ICI) having a thickness of 100 µm by means of a bar coater, so that the coated amount as an ink-receiving layer after drying would be 18 $g/m^2$. Then, it was dried for 15 minutes in a box-type drier at 70° C. and further dried for 4 minutes in a drum drier at 140° C. to obtain an ink jet recording sheet having an ink-receiving layer.

EXAMPLE 7

An ink jet recording sheet was prepared in the same manner as in Example 6 except that a silica-alumina composite sol of Example 2 was used and mixed in such a ratio that the solid content mass ratio of the sol to the polyvinyl alcohol would be 100:15 to obtain a coating fluid, and coating was carried out so that the coated amount after drying would be 23 $g/m^2$.

EXAMPLE 8

An ink jet recording sheet was prepared in the same manner as in Example 6 except that the silica-alumina composite sol of Example 3 was used and mixed in such a ratio that the solid content mass ratio of the sol to the polyvinyl alcohol would be 100:30, and the coating was carried out so that the coated amount after drying would be 20 $g/m^2$.

EXAMPLE 9

An ink jet recording sheet was prepared in the same manner as in Example 6 except that the alumina sol of Example 4 was used and mixed in such a ratio that the solid content mass ratio of the sol to the polyvinyl alcohol would be 100:7, and the coating was carried out so that the coated amount after drying would be 28 $g/m^2$.

EXAMPLE 10

An ink jet recording sheet was prepared in the same manner as in Example 6 except that the dispersion of the silica gel powder of Example 5 was used and mixed in such a ratio that the solid content mass ratio of the sol to the polyvinyl alcohol would be 100:40, and the coating was carried out so that the coated amount after drying would be 20 $g/m^2$.

EXAMPLE 11

An ink jet recording sheet was prepared in the same manner as in Example 6 except that the dispersion of the silica gel powder of Example 5 was used and mixed in such a ratio that the solid content mass ratio of the sol to the polyvinyl alcohol would be 100:60, and the coating was carried out so that the coated amount after drying would be 20 $g/m^2$.

Then, with respect to the ink jet recording sheets of Examples 6 to 8 (the present invention) and Examples 9 to 11 (Comparative Examples) obtained as described above, the physical properties were measured by the following methods. The results are shown in Table 3.

1) Coated amount:

The recording sheet was cut into a size of 100 mm×100 mm and then immersed in warm water of 90° C., and the coated ink-receiving layer was peeled off, whereby the coated amount was obtained from the difference in mass as between before and after the peeling.

2) Appearance:

One wherein the adhesion of the ink-receiving layer to the polyester film is good, no powder falling from the ink-receiving layer was observed, and no defects on appearance such as cracks were observed on the surface, was identified by symbol ◯, and one having such defects, was identified by symbol ×.

3) The specific surface area, the pore volume and the average pore radius of the ink-receiving layer:

Many pieces of a size of about 2 mm×2 mm were cut out from the recording sheet in such a state that the ink-receiving layer was bonded to the substrate polyester film. Then, these pieces were vacuum-deairated at 80° C. under a pressure of at most 13.3 Pa for two hours, and then the isothermal line for adsorption/desorption of nitrogen was measured by means of the same nitrogen adsorption/desorption apparatus as mentioned above. The mass of the ink-receiving layer subjected to the measurement, was calculated by the following formula from the mass of the piece subjected to the measurement, the mass per unit area of the recording sheet and the coated amount. And, the specific surface area, the pore volume and the average pore radius of the ink-receiving layer were obtained therefrom.

Mass (g) of the ink-receiving layer subjected to the measurement= [M/m]×Coated amount (g/m²)

where M is the mass (g) of the piece of the recording sheet comprising the substrate and the ink-receiving layer subjected to the measurement, and m is the mass per unit area of the recording sheet comprising the substrate and the ink-receiving layer (g/m²).

Figure 2:
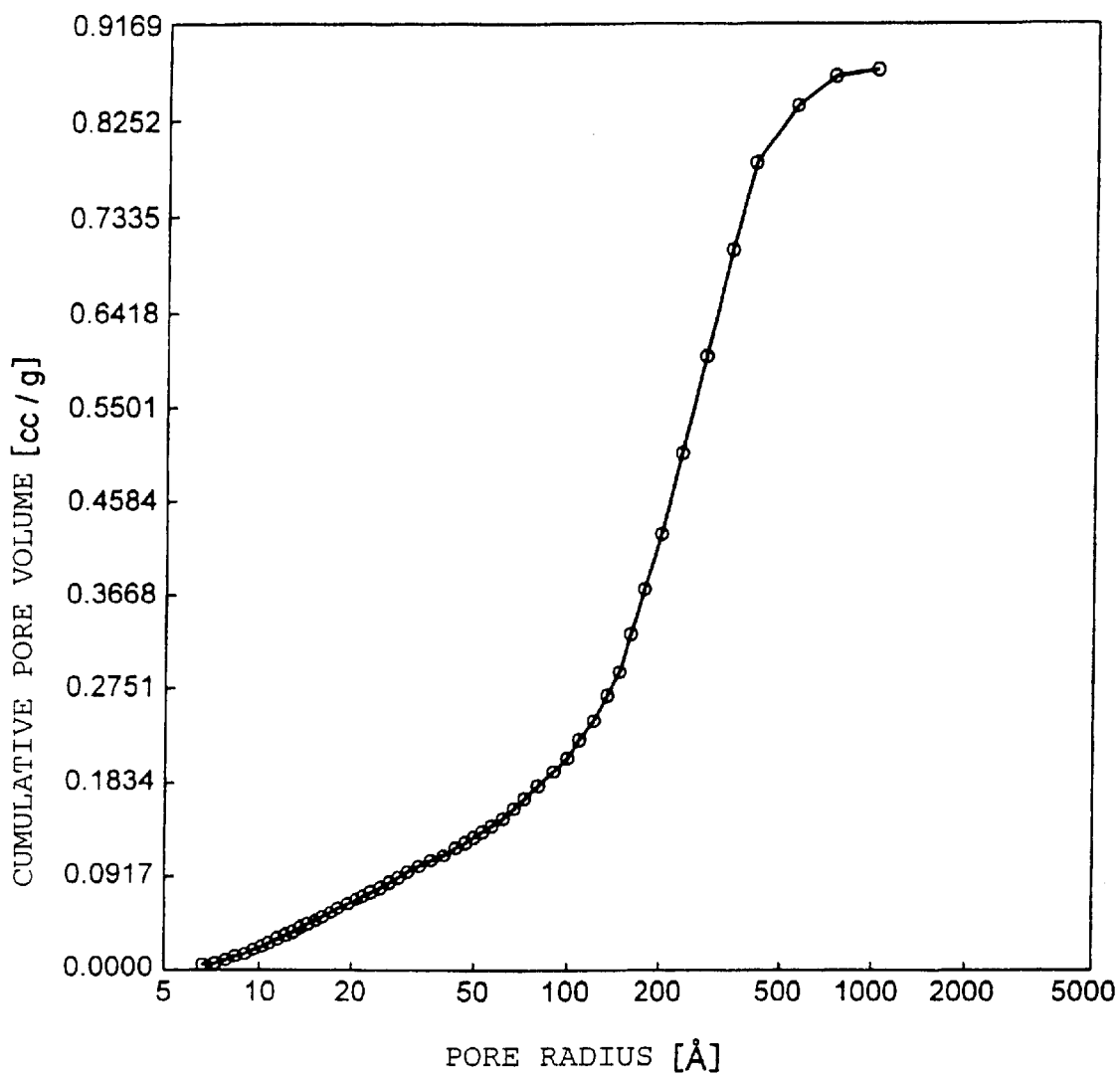
FIG. 2 shows a cumulative pore volume distribution curve of an ink-receiving layer in the ink jet recording sheet of Example 7 of the present invention.

However, in Example 10, the ink-receiving layer was not firmly bonded to the substrate, and the ink-receiving layer was easily peeled from the substrate. Therefore, the powder of this ink-receiving layer was measured directly. Further, the specific surface area, the pore volume and the average pore radius were measured in the same manner as described above. The cumulative pore volume distribution curves of the ink-receiving layers in the ink jet recording sheets of Examples 6 and 7 are shown in FIGS. 1 and 2, respectively. In these Figures, the average pore radius which is a pore radius corresponding to a pore volume of ½ of the total pore volume, is 16.7 nm in FIG. 1 (Example 6), and 20.0 in FIG. 2 (Example 7).

4) Absorption capacity per unit area of the recording sheet:

Obtained by the following formula from the coated amount and the pore volume.

Absorption capacity (cm³/m²)=Coated amount (g/m²)×Pore volume (cm³/g)

TABLE 3

|  | Coated amount (g/m²) | Appearance | Specific surface area (m²/g) | Pore volume (cm³/g) | Average pore radius (nm) | Absorption capacity (cm³/m²) |
|---|---|---|---|---|---|---|
| Ex. 6 | 18 | ○ | 129 | 1.09 | 16.7 | 20 |
| Ex. 7 | 23 | ○ | 123 | 0.87 | 20.0 | 20 |
| Ex. 8 | 20 | ○ | 130 | 1.16 | 16.3 | 23 |
| Ex. 9 | 28 | ○ | 130 | 0.71 | 10.4 | 20 |
| Ex. 10 | 20 | X | 158 | 0.70 | 8.8 | 14 |
| Ex. 11 | 20 | ○ | 125 | 0.58 | 7.2 | 12 |

With the recording sheets of Examples 6, 7 and 9, the absorption capacity per unit area was the same, and accordingly, with respect to these recording sheets, printing tests were carried out by the following method. The results are shown in Table 4.

Printing Test Method

Using a color ink jet printer (PM-3300C, tradename), manufactured by Seiko Epson Co., Ltd., 200% solid printing of Green was carried out by a photo print paper mode.

Further, using a color ink jet printer (PM-5000C and Hardlip PS-5000, tradenames), manufactured by Seiko Epson Co., Ltd., 200% solid printing of Green was carried out by a glossy paper mode.

Still further, using a color ink jet printer (NOVAJET III, tradename), manufactured by ENCAD Company, 200% solid printing of Blue was carried out by a four pass unidirectional printing mode and one pass bi-directional printing mode.

With respect to the printed products, one free from beading due to inadequate absorptivity was identified by symbol ○, and one having beading was identified by symbol ×.

TABLE 4

| | Printer | | | |
|---|---|---|---|---|
| Example No. | PM3300C (Photo print paper mode) | PM-500C (Glossy paper mode, provided with a lip) | NOVA-JET III (Four pass, unidirectional) | NOVA-JET III (One pass, bidirectional |
| Ex. 6 | ○ | X | ○ | X |
| Ex. 7 | ○ | ○ | ○ | ○ |
| Ex. 9 | X | X | X | X |

EXAMPLE 12

(Present Invention)

The ink absorption time and the dot diameters a and b of the recording medium of Example 7 were measured.

EXAMPLE 13

(Comparative Example)

The ink absorption time and the dot diameters a and b of a commercially available PPC paper were measured.

EXAMPLE 14

(Comparative Example)

The ink absorption time and the dot diameters a and b of Photo jet paper QP (thick glossy paper), manufactured by Konica Co., Ltd. were measured.

EXAMPLE 15

(Comparative Example)

The ink absorption time and the dot diameters a and b of Superfine exclusive paper (product number MJSP1) manufactured by Seiko Epson Co., Ltd., were measured.

EXAMPLE 16

(Comparative Example)

The ink absorption time and the dot diameters a and b of a high quality paper for color BJ (product number HR-101) manufactured by Canon Inc., were measured.

EXAMPLE 17

(Comparative Example)

The ink absorption time and the dot diameters a and b of an ink jet recording paper (product number HP51630Z) manufactured by HP Company, were measured.

TABLE 5

|  | Ink absorption time (msec) | Dot diameter a (μm) | Dot diameter b (μm) | (a · b)½ (μm) |
|---|---|---|---|---|
| Ex. 12 | 6 | 115 | 98 | 106 |
| Ex. 13 | >1000 | 86 | 71 | 89 |
| Ex. 14 | >250 | 120 | 112 | 116 |
| Ex. 15 | 109 | 101 | 91 | 96 |
| Ex. 16 | 17 | 89 | 87 | 88 |
| Ex. 17 | 13 | 136 | 121 | 128 |

EXAMPLE 18

(Present Invention)

Into a glass reactor having a capacity of 2,000 cm$^3$, 661.2 g of a No. 3 sodium silicate solution (SiO$_2$ concentration: 24.20 mass %, Na$_2$O concentration: 7.96 mass %) and 930 g of deionized water were put, and 336.9 g of 5 mol/l hydrochloric acid was slowly added thereto over a period of one hour with stirring. Thereafter, the mixture was heated to 80° C. and aged at 80° C. for 4 hours with stirring, to obtain a silica hydrogel.

The primary particle diameter of silica in this silica hydrogel was 6.9 nm. To this silica hydrogel, 102 g of an aqueous polyaluminum chloride solution (aluminum concentration calculated as Al$_2$O$_3$: 23.6 mass %, Cl concentration: 8.1 mass %, basicity: 84%, Takibine #1500, tradename, manufactured by Taki Chemical Co., Ltd.) was gradually added over a period of about 10 minutes. After completion of the addition, the mixture was maintained at 80° C. for further one hour with stirring to obtain a solution of a mixture of a silica hydrogel and an acidic aluminum salt.

Then, this reaction solution was subjected to ultrafiltration by means of an ultrafiltration apparatus while adding deionized water to maintain the amount of the liquid to be constant until the electrical conductivity of the filtrate decreased to a level of at most 50 μS/cm, for purification.

Then, to this purified solution, an amide sulfuric acid solution having a concentration of 10 mass % was added to adjust the pH to 4.5 to obtain a silica-alumina composite sol.

This sol was subjected to various evaluations by the after mentioned methods, (the same applies to other Examples). This sol was aggregated so that the average particle diameter of the aggregate particles was 289 nm, and the aggregate particles were positively charged. A xerogel obtained by drying this sol, had a large total pore volume and a large average pore radius and showed excellent performance with respect to the ink absorptivity, water resistance and scratch resistance, as the characteristics of an ink-receiving layer.

EXAMPLE 19

A silica-alumina composite sol was obtained in the same manner as in Example 18 except that 48 g of a sodium chloride powder was added to the mixture of the No. 3 sodium silicate solution and deionized water, followed by stirring for 30 minutes to dissolve the sodium chloride powder, and then the 5 mol/l hydrochloric acid solution was added. The primary particle diameter of silica in the silica hydrogel was 7.0 nm.

The obtained silica-alumina composite sol was aggregated so that the average particle diameter of the aggregate particles was 404 nm, and the aggregate particles were positively charged. A xerogel obtained by drying this sol, had a large total pore volume and a large average pore radius and showed excellent performance with respect to the ink absorptivity, water resistance and scratch resistance, as the characteristics of an ink-receiving layer.

EXAMPLE 20

(Comparative Example)

Into a glass reactor having a capacity of 2,000 cm$^3$, 198.0 g of a silica sol having spherical silica primary particles having an average particle diameter of the primary particles of 17 nm dispersed (SiO$_2$ concentration: 40.4 mass %, Na$_2$O concentration: 0.41 mass %, Cataloid SI-40, tradename, manufactured by Shokubai Kasei Kogyo Co., Ltd.) and 1,402 g of deionized water were put, and heated to 80° C. When the mixture became 80° C., 85.9 g of an aqueous polyaluminum chloride solution as used in Example 18 was gradually added over a period of about 10 minutes with stirring. After completion of the addition, the mixture was maintained at 80° C. for further one hour with stirring. This reaction solution was subjected to ultrafiltration by means of an ultrafiltration apparatus while adding deionized water to maintain the amount of the liquid to be constant until the electrical conductivity of the filtrate decreased to a level of at most 50 μS/cm, for purification, to obtain a silica-alumina composite sol. With respect to this sol, the same evaluations as in Example 18 were carried out.

Measurement of the Physical Properties of the Sol

In the foregoing, the physical properties of the sol were measured as follows. With respect to the primary particle diameter of silica in the silica hydrogel, firstly, the specific surface area was obtained by titration with sodium hydroxide in accordance with the method disclosed by Sears in Anal. Chem., 28[12], 1981(1956), and then the primary particle diameter of silica was calculated by D=6000/A·d, where D is the particle diameter (nm) of the silica sol, A is the specific surface area (m$^2$/g), and d is the density (2.2 g/cm$^3$).

For the sol concentration, the sol was dried at 140° C. until it became a constant mass, and the sol concentration was obtained from the difference in weight as between before and after the drying. The pH was measured by means of a pH meter HM-12P, manufactured by Towa Denpa Co., Ltd. The zeta potential was measured by means of an electrophoretic light scattering photometer ELS-800, manufactured by Otsuka Denshi Co., Ltd. The average particle diameter of the aggregate particles was measured by means of a laser scattering particle size meter PAR-III, manufactured by Otsuka Denshi Co., Ltd.

TABLE 6

| Example No. | Primary particle diameter of silica (nm) | Sol concentration (mass %) | pH | Zeta potential (mV) | Average particle diameter of aggregate particles (nm) |
|---|---|---|---|---|---|
| Ex. 18 | 6.9 | 24.4 | 4.5 | +42 | 289 |
| Ex. 19 | 7.0 | 28.7 | 4.5 | +40 | 404 |
| Ex. 20 | 17.0 | 7.1 | 4.8 | +45 | 129 |

Measurement of the Physical Properties of the Xerogel

The sols of Examples 18 to 20 were dried at 140° C. until they became a constant mass to obtain xerogel powders. Each powder was vacuum-deairated at 120° C. under a pressure of 13.3 Pa for two hours, and then the specific surface area, the total pore volume and the average pore radius were measured by means of a nitrogen absorption/desorption apparatus (Autosorb 3B model, tradename, manufactured by Quantachrome Company). The average pore radius is a value calculated by 2V/A×10$^3$. The results are shown in Table 7.

TABLE 7

|  | Specific surface area (m$^2$/g) | Pore volume (cm$^3$/g) | Average pore radius (nm) |
|---|---|---|---|
| Ex. 18 | 192 | 1.35 | 14.1 |
| Ex. 19 | 135 | 1.07 | 15.8 |
| Ex. 20 | 163 | 0.45 | 5.5 |

Evaluation of the Characteristics of the Ink-Receiving Layer

To each of the sols of Examples 18 to 20, an aqueous polyvinyl alcohol solution (MA26GP, tradename, manufactured by Shinetsu Chemical Co., Ltd.) was mixed in such a ratio that the solid content ratio would be 100:30, to obtain a coating fluid, which was coated on a paper substrate having a thickness of 170 μm and a weight of 165 g/m$^2$ by means of a bar coater so that the film thickness after drying would be 25 μm, followed by drying at 70° C. for 15 minutes, to obtain an ink jet recording sheet. The characteristics of this ink-receiving layer were examined by the following methods.

Ink absorptivity: 100% solid printing of black, cyan, magenta or yellow, was carried out by means of a color printer PM-750C, manufactured by Seiko Epson Co., Ltd., whereby one free from beading was identified by symbol ◯, and one having beading due to inadequate absorptivity was identified by symbol ×.

Water resistance: a water droplet was dropped on the above printed portion by a pipette, whereby one having no running of ink was identified by symbol ◯, and one having running of ink was identified by symbol ×.

Scratch resistance: by a method disclosed in JP-A-7-76162, i.e. by means of a rubbing tester manufactured by Suga Shikenki Co., Ltd., a rubbing test of 100 times was carried out by pressing a cotton gauze with a load of 200 g against the surface of the ink-receiving layer, whereupon the surface was visually inspected, and one free from scratch marks was judged to have good scratch resistance and identified by symbol ◯, and one having scratch marks was identified by symbol ×.

TABLE 8

|  | Ink absorptivity | Water resistance | Scratch resistance |
|---|---|---|---|
| Ex. 18 | ◯ | ◯ | ◯ |
| Ex. 19 | ◯ | ◯ | ◯ |
| Ex. 20 | X | ◯ | ◯ |

The silica-alumina composite sol of the present invention is mixed with a suitable binder to form a coating fluid, and this coating fluid is coated on and in a substrate and dried, whereby an ink-receiving layer excellent in the ink absorptivity, water resistance and scratch resistance, can be formed. The ink-receiving layer thus obtained, is suitable as a recording medium for an ink jet printer.

According to the present invention, it is possible to obtain a recording medium excellent in the ink absorbing ability as compared with conventional media, without deteriorating such characteristics as the color reproducibility, the image density and the weather resistance. Such a recording medium is suitable as a recording medium for e.g. an ink jet printer employing a dye ink or a pigment ink.

Further, according to the present invention, it is possible to present a process for commercially advantageously producing the above recording medium having excellent characteristics.

The entire disclosure of Japanese Patent Application No. 11-369468 filed on Dec. 27, 1999 and Japanese Patent Application No. 2000-127035 filed on Apr. 27, 2000, including specification, claims, drawings and summary are incorporated herein by reference in their entireties.

What is claimed is:

1. A recording medium comprising a substrate and an ink-receiving layer comprising a xerogel formed thereon, wherein in the ink-receiving layer, the total pore volume of pores with radii of from 0.7 to 100 nm as measured by a nitrogen adsorption/desorption method, is at least 0.8 cm$^3$/g, and the average pore radius as defined by a radius corresponding to a pore volume of ½ of the pore volume of pores with radii of from 0.7 to 100 nm in a cumulative pore volume distribution curve obtained by a BJH method from a nitrogen desorption isothermal line, is at least 14 nm, wherein the xerogel is obtained by removing the solvent from a silica-alumina composite sol obtained by reaction of an acidic aluminum salt and a silica hydrogel, and wherein the reaction is carried out by adding the acidic aluminum salt in an amount of from 1 to 40 g as Al$_2$O$_3$ per 100 g of SiO$_2$ component in silica hydrogel.

2. The recording medium according to claim 1, wherein the total pore volume of pores with radii of from 0.7 to 100 nm as measured by a nitrogen adsorption/desorption method, is at least 1.0 cm$^3$/g.

3. The recording medium according to claim 1, wherein the average pore radius as defined above is at least 20 nm.

4. The recording medium according to claim 1, wherein the ink-receiving layer contains a binder together with the xerogel, wherein the content of the binder is from 10 to 40 parts by pass per 100 parts by mass of the xerogel, by solid content ratio.

5. A process for producing the recording medium, which comprises coating on a substrate a coating fluid comprising a binder and a silica-alumina composite sol obtained by mixing to a silica hydrogel an aluminum salt which, when dissolved in water, gives an acidic solution, followed by drying to form an ink-receiving layer.

6. The process for producing a recording medium according to claim 5, wherein the silica-alumina composite sol is obtained in such a manner that after mixing the silica hydrogel and the aluminum salt which, when dissolved in water, gives an acidic solution, a salt in the solution is removed, and an acid is added for peptization.

7. The process for producing a recording medium according to claim 5, wherein the silica hydrogel is one obtained by mixing an alkali metal silicate with an acid, or one obtained by adding to an alkali metal silicate a salt having a function to aggregate silica, followed by mixing with an acid.

8. The process for producing a recording medium according to claim 5, wherein in the ink-receiving layer, the total pore volume of pores with radii of from 0.7 to 100 nm as measured by a nitrogen adsorption/desorption method, is at least 1.3 cm$^3$/g, and the average pore radius as defined by a radius corresponding to a pore volume of ½ of the pore volume of pores with radii of from 0.7 to 100 nm in a cumulative pore volume distribution curve obtained by a BJH method from a nitrogen desorption isothermal line, is at least 15 nm.

9. The process for producing a recording medium according to claim 5, wherein the ink-receiving layer contains a binder together with the xerogel, wherein the content of the binder is from 10 to 40 parts by mass per 100 parts by mass of the xerogel, by solid content ratio.

10. The process for producing a recording medium according to claim 5, wherein the silica-alumina composite sol is a colloidal solution comprising an aqueous medium and aggregate particles dispersed therein each comprising silica and alumina, wherein the primary particles of silica are spherical, the average particle diameter of the primary particles is from 2 to 200 nm, the average particle diameter of the aggregate particles is from 100 to 1,000 nm, the zeta potential of the aggregate particles is at least +10 mV, and the pH of the solvent is from 3 to 9.

* * * * *